May 10, 1949.  C. C. LAURITSEN  2,469,350
ROCKET DEVICE

Filed April 2, 1943  3 Sheets-Sheet 1

INVENTOR
CHARLES C. LAURITSEN
BY
ATTORNEY

May 10, 1949. C. C. LAURITSEN 2,469,350
ROCKET DEVICE
Filed April 2, 1943 3 Sheets-Sheet 2

INVENTOR
CHARLES C. LAURITSEN
BY
ATTORNEY

May 10, 1949.　　　C. C. LAURITSEN　　　2,469,350
ROCKET DEVICE

Filed April 2, 1943　　　　　　　　　　　　3 Sheets-Sheet 3

INVENTOR
CHARLES C. LAURITSEN
BY
ATTORNEY

Patented May 10, 1949

2,469,350

UNITED STATES PATENT OFFICE 2,469,350

ROCKET DEVICE

Charles C. Lauritsen, Pasadena, Calif., assignor to the United States of America as represented by the Secretary of the Navy Application April 2, 1943, Serial No. 481,645

4 Claims. (Cl. 102—49)

This invention relates to jet propulsion rockets and more particularly to a novel rocket motor having a combustible propellant charge and an electrically operable system for igniting the charge to start the motor. The new motor is of a simple and compact construction adapted for manufacture at low cost, and because of the electrical ignition system it may be started quickly and easily and is reliable in operation. Accordingly, the motor may be used to particular advantage to project bombs, and the like, in weapons requiring a high degree of reliability and facility in operation, as disclosed in my copending application Ser. No. 481,644, filed April 2, 1943, now Pat. No. 2,464,181. It will be understood, however, that the motor may be used for other purposes as well.

In the above identified application, I have disclosed a rocket driven bomb for use in destroying enemy submarines, the rocket motor having a powder charge for propelling the bomb through an air trajectory of substantial range into the water. In the practice of submarine warfare with the new rocket bomb, several of the bombs are fired substantially simultaneously from one or more projectors on the attacking craft and with a dispersion such as to produce a pattern calculated to cover a predetermined area in which the submarine is located, whereby at least one of the bombs is exploded by impact with the submarine. In order to obtain the desired pattern from a moving craft, it is necessary that the rocket motor of each bomb be fired at precisely the proper time in relation to the firing of the other rocket motors, which requires accurate and reliable ignition of the rocket propellant. Moreover, the ignition system for the propellant should be operable quickly and easily, even under adverse operating conditions.

One object of the present invention, therefore, resides in the provision of a novel rocket motor having an electrical ignition system which is readily operable to start combustion of the rocket propellant under conditions encountered in warfare. A rocket motor made in accordance with my invention comprises a hollow body for receiving a combustible propellant charge, and an electrically operable igniter, such as a squib, disposed adjacent the propellant. On the outside of the body is a contact which is electrically connected to the igniter, preferably by wiring extending through a nozzle in the rear end portion of the body for discharging the products of combustion of the propellant. The contact is engageable with a cooperating fixed contact on a support or projector for the rocket, so that when the rocket is inserted in the projector the igniter is ready to be energized through the interengaging contacts from a suitable current source.

Another object of the invention is to provide a rocket motor having a combustible propellant charge and an electrical ignition system for the charge including means serving the dual function of supporting a contact and stabilizing the motor in its flight. In the preferred construction of the motor, the contact is in the form of a ring extending around the outside of the motor body and connected thereto by radial fins. The ring is preferably engageable with a fixed knife blade contact on the rocket projector, from which the propellant igniter is adapted to be energized through the ring and the fins, and in the subsequent operation of the motor by combustion of the propellant, the flight characteristics of the motor are improved by the action of the fins. Preferably, the fins are disposed at an angle to the motor axis so that the motor is caused to rotate in its underwater trajectory due to the hydrodynamic action of the water on the fins.

Still another object of the invention resides in the provision of a rocket motor having a double tail ring assembly for bracing the fins and through which the propellant igniter is energized. The two tail rings are disposed coaxially around the rear end portion of the motor body and in closely spaced, end-to-end relation, the rings being connected to and supported by the outer ends of the radial fins. One of the rings is grounded to the motor body through the fins and is electrically connected to one side of the propellant igniter in the body, while the other side of the igniter is connected by wiring to the other ring which is insulated from the first ring and the body. When the rocket is mounted in the projector, the rings engage two separate contacts to prepare an operating circuit including the igniter and a current source. Preferably, a short-circuiting element is normally connected between the two contact rings to prevent accidental energizing of the igniter in handling the rocket, and the shorting element is removed when the rocket is to be fired.

A further object of the invention resides in the provision of a novel rocket motor having an electrical ignition system for the propellant in which the firing is at least partly sheathed by the propellant charge. In one form of my invention, the propellant charge is a cylindrical powder grain having an axial passage extending through it to control the rate of combustion, the grain being supported in a generally cylindrical motor body. The electrical igniter is preferably disposed in the body adjacent the front end of the powder grain and is connected to the switch contact on the outside of the body by wiring extending through the passage in the grain. Thus, the passage in the grain not only controls the burning rate but also serves as a conduit for protecting the wiring of the ignition system and facilitating assembly of the motor.

These and other objects of the invention may be better understood by reference to the accompanying drawings, in which Fig. 1 is a longitudinal sectional view of one form of the new motor;

Figure 1:
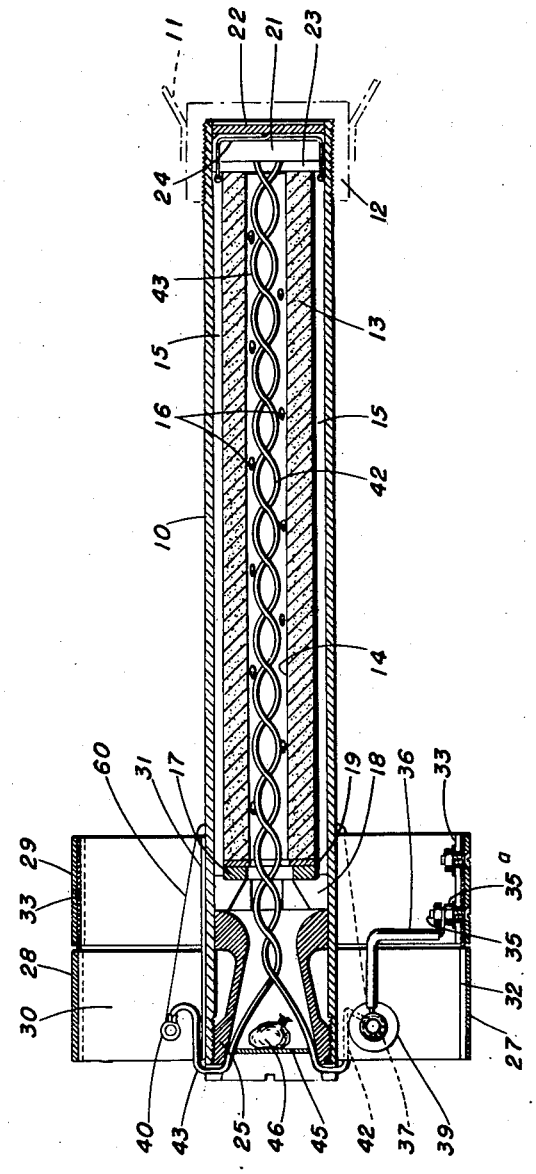
Figure 2:
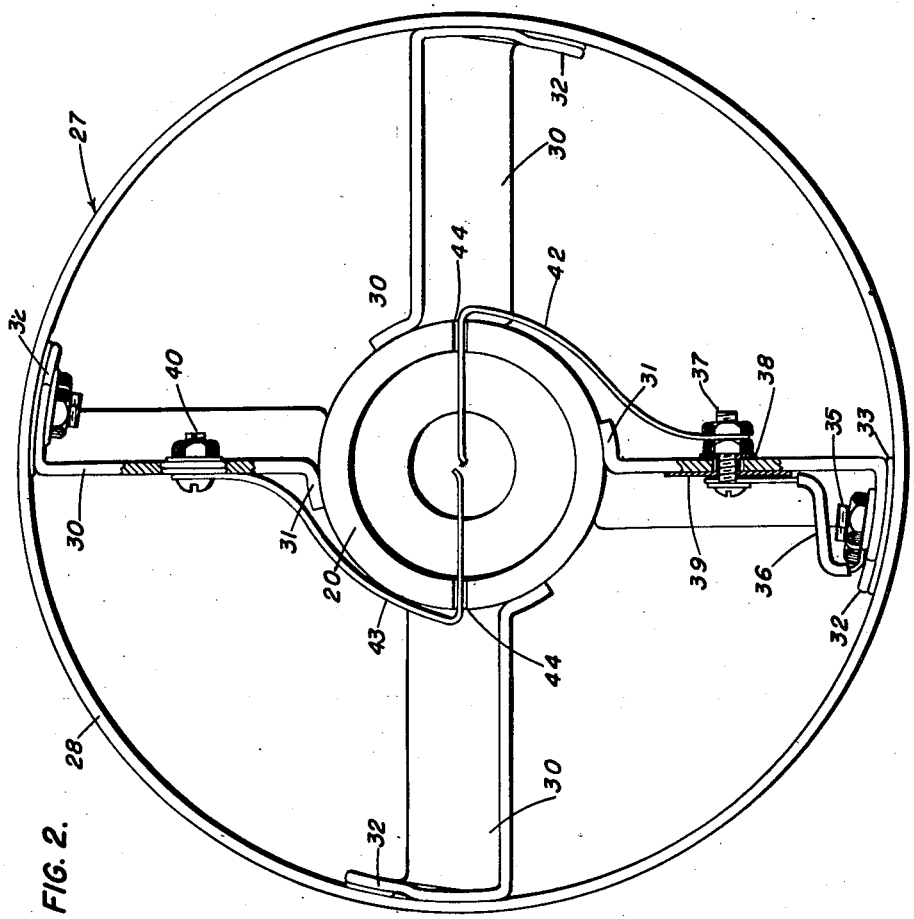
Fig. 2 is an enlarged end view of the motor shown in Fig. 1.
Figure 3:
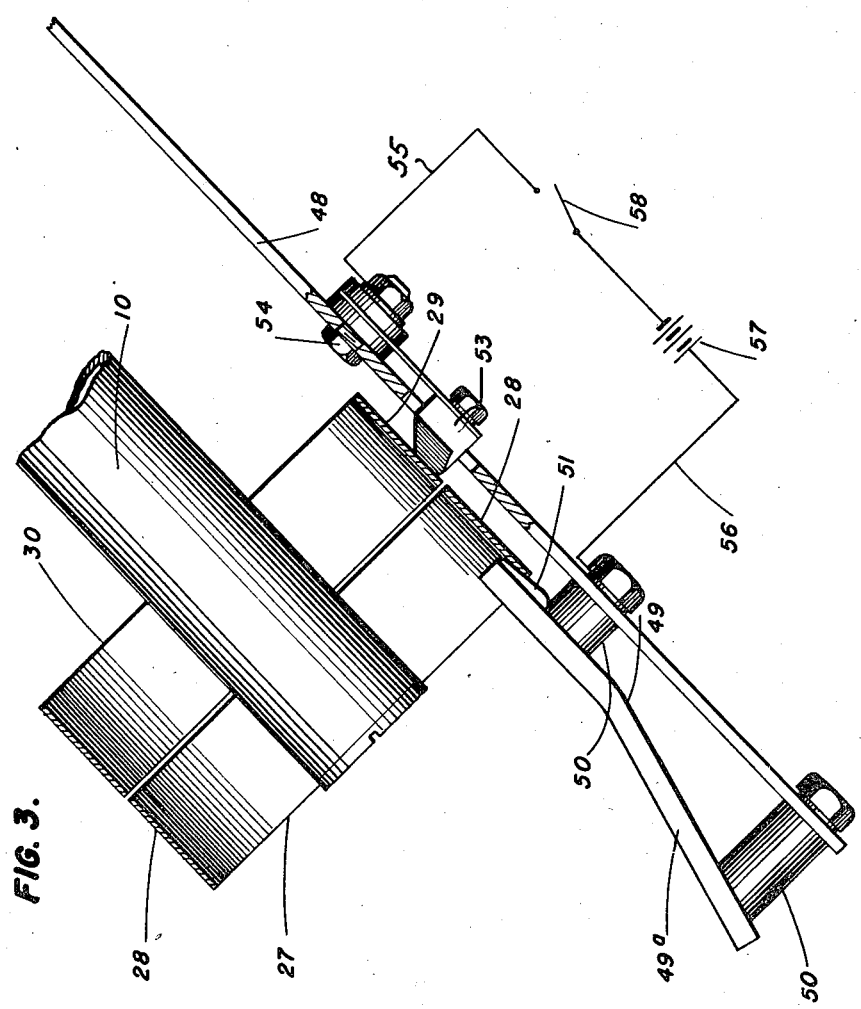
Fig. 3 is a longitudinal sectional view of part of the motor and a projector for supporting it, showing schematically a circuit for energizing the igniter.

The motor comprises a hollow cylindrical body 10, which may be made of seamless steel tubing, connected at its front end to a payload, such as a bomb 11. In its rear end, the bomb casing has a recess for receiving the closed end of a cup-shaped adaptor 12 welded to the side wall of the recess, and the front end of the body 10 is threaded into the adaptor. Within the motor body is a propellant charge in the form of a cylindrical powder grain 13, such as ballistite, the grain having an axial passage 14 and spaced longitudinal ribs 15 on its outer cylindrical surface. The powder grain fits closely in the motor body on the ribs 15 which serve to space the outer cylindrical surface of the grain from the inner wall of the body to provide external combustion spaces between the ribs. Preferably, the grain has a general spiral series of radial openings 16, as disclosed in my copending application Ser. No. 481,644, filed April 2, 1943.

At its rear end, the powder grain 13 is supported by a grid comprising a ring 17 and radial legs 18 which fit closely in the body so as to support the ring in concentric relation to the grain passage 14. The ring is connected to the end of the powder grain by a combustaible washer 19 made of Celluloid, or the like, and cemented on its opposite faces to the ring and the grain, respectively.

An electrically operable igniter 21 is disposed in the front end of the motor body and is separated from the closed end of the adaptor 12 by a fibre plug 22. The igniter is spaced from the front end of the powder grain in any suitable manner to provide a chamber 23 communicating with the passage 14 and the external combustion spaces between the ribs 15. As shown, the front ends of the ribs 15 project beyond the adjacent end of the grain and engage the igniter around its peripheral portion to hold it in spaced relation to the grain. The igniter may be connected to the powder grain by a wire 24 extending through openings in the ends of the ribs. The powder grain assembly is held against the end of the adaptor 12 by a nozzle 25 threaded into the rear end of the motor body against the grid 17—18. It will be apparent that the powder grain is supported in the motor body in concentric relation to the cylindrical wall thereof by the ribs 15, and the axial passage 14 in the grain is alined with the openings in the washer 19, the grid ring 17 and the nozzle.

The rocket motor has a tail assembly 27 comprising a pair of metal rings 28 and 29 extending around the rear end portion of the motor body and disposed end to end in closely spaced relation. The rings are concentric with the motor body and are supported thereon by radial fins 30 of any desired number, four fins being illustrated in the drawings. Preferably, the fins are set at an angle to the axis of the motor so as to cause the motor to rotate during its flight, as I have found that by rotating the motor in this manner, its flight stability and under-water trajectory are substantially improved. The inner ends of the fins 30, as shown, are formed with flanges 31 welded to the cylindrical surface of the motor body, and the outer ends of the fins have flanges 32 welded to the inner surfaces of the rings. The front ring 29 is insulated from the ring 28 and the motor body by insulating strips 33 interposed between the inner surfaces of the ring 29 and the flanges 32 of the fins.

A terminal screw 35 extends through the front ring 29 and one of the flanges 33 and is insulated from the flange by an insulating collar 35a. The terminal screw 35 is connected by an insulated wire 36 to another terminal screw 37 extending through the adjacent fin 30, the screw 37 being insulated from the fin by a collar 38 aud washer 39 of insulating material. The opposite fin 30 is provided with a terminal screw 40 electrically connected through the fin to the tail ring 28.

The terminals 37 and 40 are electrically connected to the opposite sides of the igniter 21 by wires 42 and 43, respectively, extending through the nozzle, the grid 17—18, and the passage 14 in the powder grain. If desired, the rear end of the nozzle may be formed with radial grooves 44 for receiving the wires. Preferably, the interior of the motor body is sealed by a cardboard plug 45 fitted closely in the nozzle, and a container of desiccant 46, such as a silica-gel, is placed in the body to absorb any moisture therein.

The rocket is adapted to be fired from a projector or guide 48 which may take the form of an elongated trough for receiving the casing of the bomb 11. The trough is normally inclined at a desired firing angle, and a plate 49 is secured by posts 50 to the rear end portion of the trough above the bottom thereof, the lower part of the plate being inclined, as shown at 49a, to deflect the blast from the motor and thereby prevent burning of the platform (not shown) on which the projector is mounted. A contactor blade 51 on the bottom of the plate extends forwardly from the front post 50 and has an inclined edge adapted to extend into the tail ring 28 and engage its inner surface. A second contactor 53 is mounted on the projector in front of the contactor 51 and in position to engage the insulated ring 29 on the motor. The contactor 53 is insulated from the projector in any suitable manner and is connected under the projector to an insulated terminal 54 through a wire 55. The contactor 51 is electrically connected through one of the posts 50 and a wire 56 to one side of a current source 57, the other side of the current source being connected through a switch 58 and the wire 55 to the terminal 54.

In the operation of the rocket, the motor and bomb assembly is placed in the projector trough 48 which holds the bomb securely against lateral displacement. The assembly is then moved rearwardly in the projector trough until the tail ring 28 slides under the contactor blade 51 and makes a firm but slidable interlock therewith. In this position of the assembly, the contactor 51 prevents further rearward movement of the rocket, due to the inclined surface of the contactor, and the insulated ring 29 is firmly pressed down into engagement with the contactor 53. When it is desired to fire the rocket, the switch 58 is closed, whereupon a circuit is established which is traceable from one side of the current source 57 through the switch, terminal 54, wire 55, contact 53, the insulated ring 29, terminal 35, wire 36, terminal 37, wire 42, the igniter, wire 43, terminal 40, the adjacent fin 30, ring 28, contact 51, post 50 and wire 56 to the other side of the current source. As a result, the igniter is fired and the blast is transmitted from the chamber 23 through the axial passage 14 and the external combustion spaces between the grain ribs 15, whereby the grain burns simultaneously on all surfaces. The products of combustion are discharged at high pressure through the nozzle 25 so as to propel the motor and bomb assembly, the plug 45 being forced out of the nozzle by the pressure. The assembly, accordingly, moves forwardly in the projector trough 48 and causes the tail rings 28 and 29 to slide off the contacts 51 and 53, the assembly being guided during its acceleration by the projector trough. Preferably, the combustion of the powder grain 13 is timed so that substantially all of the propelling force is expended before the rocket leaves the projector trough, whereby an accurate flight may be obtained.

It will be apparent that the bomb and motor are stabilized in their flight by the tail assembly 27, so that the nose of the bomb strikes the water first and the parts are maintained generally in line with the trajectory both in the air and in the water. The lateral surface of the fins 30, by being inclined to the motor axis cause the bomb and motor to rotate slowly in their passage through the air and somewhat more rapidly in their underwater trajectory, whereby their flight characteristics are substantially improved. The fins 30 and the tail rings not only serve to control the flight of the bomb and motor but also form part of the ignition system for the propellant in the motor body. Also, the contact blade 51 serves the dual function of locating the bomb and motor in the projector trough and conducting current to the igniter. Due to the arrangement of the contacts 51 and 53 and the tail rings, the ignition system is automatically prepared when the bomb and motor assembly is placed in position in the projector trough, so that the motor may be fired by simply operating the switch 58, the contacts permitting movement of the assembly along the trough under the action of the propelling force without interference from the ignition system. If desired, a short-circuiting wire 60 may be connected between the terminals 37 and 40 to prevent accidental energizing of the igniter in handling the rocket assembly, the wire being removed before firing the rocket.

I claim:

1. In combination, a rocket motor having a hollow body for receiving a combustible propellant charge, an electrically operable igniter in the body for igniting the charge, a pair of contact elements on the body engageable from the outside of the body and electrically connected to the igniter, means for insulating the contact elements from each other, a projector for the motor, and means on the projector for energizing the igniter, said means including one contactor with which one contact element of said pair is engageable and a second contactor with which the other contact element of said pair is slidably interlockable.

2. In a rocket motor having a hollow body for receiving a combustible propellant charge, the combination of an electrically operable igniter in the body for igniting the charge, a pair of contact rings extending around the body and through which the igniter is energized, spiral fins connecting the rings to the tail portion of the body, means for insulating the rings from each other, and means extending through the body for electrically connecting said igniter to the rings.

3. In a rocket motor having a hollow body for receiving a combustible propellant charge, the combination of an electrically operable igniter in the body for igniting the charge, a pair of contact elements on the body engageable from outside the body and through which the igniter is energized, means for insulating the contact elements from each other, means extending through the body for electrically connecting the igniter to the contact elements, and a removable short-circuiting member connected between the contact elements for preventing accidental energizing of the igniter.

4. In combination, a rocket motor having a hollow body for receiving a combustible propellant charge, an electrically operable igniter in the body for igniting the charge, at least one contact ring extending around the outside of the body, means on the body for connecting the ring thereto, means for electrically connecting the ring to the igniter, and a projector having a fixed contactor with a portion of which the ring is slidably interlockable, another portion of which is inclined to deflect the blast when the motor is fired by energization of the igniter.

CHARLES C. LAURITSEN.

REFERENCES CITED

The following references are of record in the file of this patent:

UNITED STATES PATENTS

| Number | Name | Date |
| --- | --- | --- |
| 785,644 | Unge | Mar. 21, 1905 |
| 1,360,602 | Van Deuren | Nov. 30, 1920 |

FOREIGN PATENTS

| Number | Country | Date |
| --- | --- | --- |
| 614,192 | France | Sept. 13, 1926 |
| 367,553 | Great Britain | Feb. 25, 1932 |